April 17, 1956  J. R. DEVOTI  2,741,865
FLOAT
Filed May 17, 1954
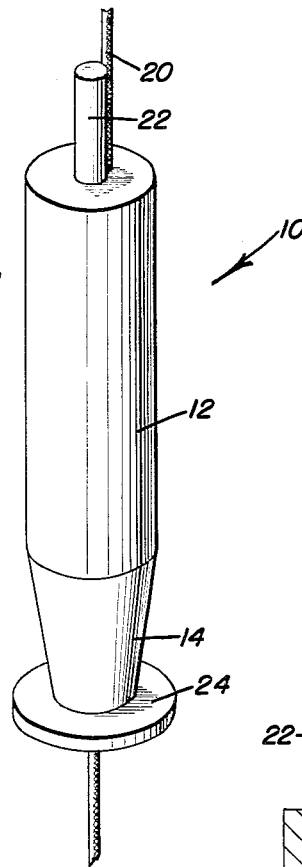
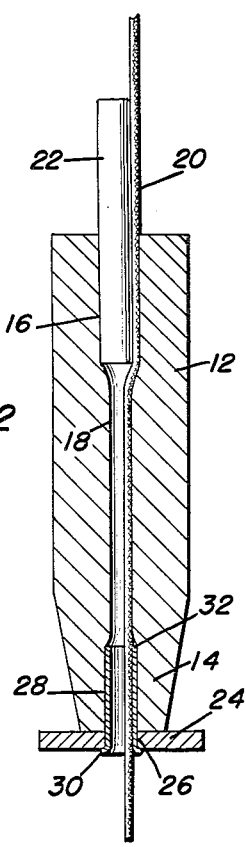
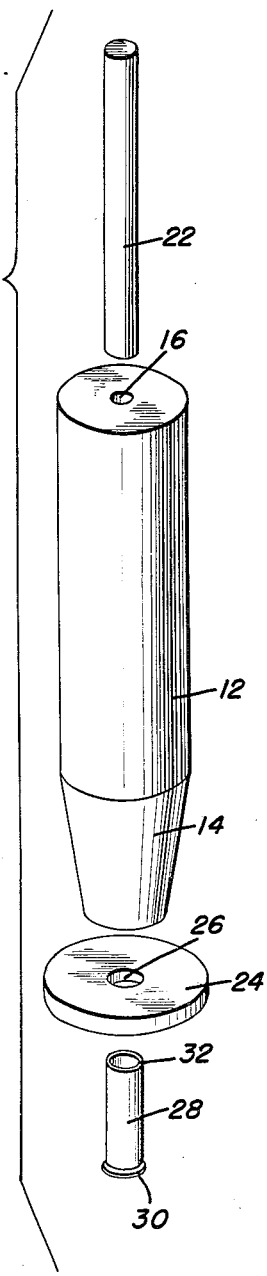
Jack R. Devoti
INVENTOR.

United States Patent Office 2,741,865
Patented Apr. 17, 1956

2,741,865

FLOAT

Jack R. Devoti, Houston, Tex.

Application May 17, 1954, Serial No. 430,113

1 Claim. (Cl. 43—44.91)

This invention relates to a fishing float for use in conjunction with a fishing line which is adapted to be easily and adjustably secured on a fishing line.

The primary object of this invention resides in the provision of a float which is not only adapted to support the end of a fishing line provided with a hook at a particular distance below the surface of the water and to dip when a bite is obtained, but will enable the fisherman to attract fish to the vicinity of his fishing line by causing a popping sound similar to that produced by a fish feeding upon food which is floating in the water when the fishing line is given a quick, short pull or jerk.

A further object of the invention resides in the provision of an arrangement of parts of a fishing float which, due to the characteristics of the different substances from which the float is made, will cause the float to ride in a generally upright position, thereby assuring a better visual indication to the fisherman that a bite has been obtained.

Still further objects and features of this invention reside in the provision of a fishing float that is strong and durable, simple in construction and manufacture, capable of being readily and speedily adjusted on the fishing line so that fishing at any particular depth may be obtained without requiring the cutting of the fishing line and which is inexpensive to produce, thereby permitting wide use and distribution.

These, together with the various ancillary objects and features of the invention which will become apparent as the following description proceeds, are attained by this fishing float, a preferred embodiment of which has been illustrated in the accompanying drawings, by way of example only, wherein:

Figure 1 is a perspective view of the fishing float comprising the present invention;

Figure 2 is a central longitudinal sectional view of the fishing float; and

Figure 3 is an exploded perspective view illustrating the construction of the various parts of the invention.

With continuing reference to the accompanying drawings wherein like reference numerals designate similar parts throughout the various views, reference numeral 10 generally designates the fishing float comprising the present invention. This fishing float includes a substantially cylindrical body 12 having a tapered lower end portion 14. The body 12 is provided with an aperture 16 therethrough having a central portion 18 of reduced bore.

The body 12 of the fishing float is adapted to be emplaced about a section of a fishing line 20 and held in place by a rod 22 which is clampingly positioned in the aperture 16 so as to wedgingly hold the fishing line 20 in position, the end of the rod 22 being wedgedly received at the center portion 18.

A disk 24 of greater diameter than that of the body 12 and which is provided with an opening 26 therethrough is held against the lower end of the body 12 by means of a tube 28 which has a rolled lower edge 30 forming a stop. The tube 28 may be formed from any suitable material, such as metal, and is resiliently clampingly held in position within the aperture 16 and has its upper edge 32 wedgingly engaging the reduced bore portion 18. The fishing line 20 extends through the tube 28.

While the fishing float 10 is, as a composite device, lighter than an equal volume of water, the body 12 is formed from a material whose specific gravity is less than water, while the disk 24 is formed from metal or the like having a specific gravity greater than water. This assures that the float 10 will remain in a substantially upright position when in use.

A quick, short jerk on the fishing line 20 will cause a popping action of the fishing float 10 similar to that made by fish feeding upon food floating in the water. A greater jerk raising the disk 24 to the surface of the water will cause an additional popping sound. It is to be recognized that because of the tapering of the portion 14 and the greater diameter of the disk 24, the popping action is accentuated.

Since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A fishing float comprising a cylindrical body having a tapered lower end, an aperture extending through said body, a disk of greater diameter than said body having an opening therethrough, a tube having an enlarged lower end forming a stop, said tube extending through said opening and into said aperture, said tube holding said disk against said tapered lower end of said body, and a rod receivable in the upper end of said body and adapted to extend into said aperture to clampingly position said float on a fishing line, said aperture having a reduced central portion for wedging engagement of said rod and said tube in said body, said body being constructed of a material of a specific gravity less than that of water and said disk being of a material of a specific gravity greater than that of water.

References Cited in the file of this patent

UNITED STATES PATENTS

| 771,263 | McCord | Oct. 4, 1904 |
| 786,597 | Picken | Apr. 4, 1905 |
| 2,500,078 | Ingram | Mar. 7, 1950 |

FOREIGN PATENTS

| 123,384 | Sweden | Nov. 23, 1948 |
| 475,781 | Canada | Aug. 7, 1951 |